US009418492B2

United States Patent
Sinner et al.

(10) Patent No.: US 9,418,492 B2
(45) Date of Patent: *Aug. 16, 2016

(54) MOBILE PHONE ENABLED DATA PROCESSING SYSTEM

(71) Applicant: The Goodyear Tire & Rubber Company, Akron, OH (US)

(72) Inventors: Yves Henri Sinner, Colmar-Berg (LU); Marc Engel, Bissen (LU); Anze Manfreda, Ljubljana (SI); Abhijit Ganguly, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/534,310

(22) Filed: Nov. 6, 2014

(65) Prior Publication Data

US 2016/0133067 A1     May 12, 2016

(51) Int. Cl.
| | |
|---|---|
| *B60Q 1/00* | (2006.01) |
| *G07C 5/08* | (2006.01) |
| *B60C 23/04* | (2006.01) |
| *B60C 1/00* | (2006.01) |

(52) U.S. Cl.
CPC .............. *G07C 5/0808* (2013.01); *B60C 23/04* (2013.01); *B60C 23/0408* (2013.01); *B60C 23/0479* (2013.01); *B60C 1/00* (2013.01); *B60C 2200/00* (2013.04)

(58) Field of Classification Search
CPC ............................... B60C 1/00; B60C 2200/00
See application file for complete search history.

(56) References Cited

U.S. PATENT DOCUMENTS

| | | | |
|---|---|---|---|
| 1,330,072 | A | 2/1920 | Geddes |
| 1,875,874 | A | 9/1932 | Johnson |
| 2,095,489 | A | 9/1935 | Cotton |
| 2,161,384 | A | 6/1939 | Rinfret |
| 4,657,057 | A | 4/1987 | Ha |
| 5,249,460 | A | 10/1993 | Dory et al. |
| 5,303,756 | A | 4/1994 | Hill |
| 5,616,196 | A | 4/1997 | Loewe |
| 6,151,959 | A | 11/2000 | Cantu et al. |
| 6,941,800 | B2 | 9/2005 | Shimura |
| 7,180,409 | B2 | 2/2007 | Brey |
| 7,322,392 | B2 | 1/2008 | Hawes |
| 7,670,123 | B2 | 3/2010 | Cuny et al. |
| 8,186,402 | B2 | 5/2012 | Eigenbrode |
| 8,573,270 | B2 | 11/2013 | Hinque |

(Continued)

FOREIGN PATENT DOCUMENTS

EP     2777957 A2     9/2014

OTHER PUBLICATIONS

European Search Report dated Feb. 25, 2016 for Application Serial No. 15192357.

*Primary Examiner* — Shirley Lu
(74) *Attorney, Agent, or Firm* — Robert N. Lipcsik (57) ABSTRACT

A system monitors and controls pressure of vehicle parts. The system consists of: a fleet of vehicles, each vehicle of the fleet having a cab and a trailer; a controller maintaining a wireless server and database for the fleet of vehicles; a first cellular device transmitting data to and from an electronic control unit of the cab of each vehicle and the controller; and a second cellular device transmitting data to and from an electronic control unit of the trailer of each vehicle and the controller. The first cellular device and the second cellular device each utilize a publicly accessible cellular network for communication with the controller.

17 Claims, 4 Drawing Sheets

(56) References Cited

U.S. PATENT DOCUMENTS

| | | |
|---|---|---|
| 8,807,182 B2 | 8/2014 | Kelly |
| 2002/0061758 A1* | 5/2002 | Zarlengo et al. ........ G01D 21/00 455/517 |
| 2003/0155164 A1* | 8/2003 | Mantini et al. ........ B60G 17/005 280/149.2 |
| 2008/0084285 A1 | 4/2008 | Bhogal |
| 2011/0080282 A1 | 4/2011 | Kleve et al. |
| 2012/0029759 A1* | 2/2012 | Suh et al. ............. G05B 19/042 701/29.4 |
| 2013/0304276 A1* | 11/2013 | Flies ...................... G06F 17/00 701/1 |
| 2013/0312509 A1 | 11/2013 | Solomon et al. |

\* cited by examiner

MOBILE PHONE ENABLED DATA PROCESSING SYSTEM

FIELD OF THE INVENTION

The present invention relates generally to vehicle tires, and more particularly, to a data processing system for vehicle tire data.

BACKGROUND OF THE INVENTION

Vehicle owners nearly always need to deal with maintenance and replacement of wearable parts such as tires and belts. For example, tire maintenance generally involves making sure that the tires have the proper air pressure and do not run too hot, and periodically observing the tread wear, either by visual check of uniform wear, or by direct measurement of tread depth. Uneven wear between tires indicates that a rotation of tires is needed. Uneven wear on one tire indicates that there is a suspension problem with the vehicle. In either case, there is a problem that needs attention. However, the responsibility for this maintenance is often neglected. Without this maintenance, part life is generally shortened, which wastes resources and the consumer's money. Systems have been developed to monitor air pressure in tires. In addition, tires have been developed that can run without any air pressure for short periods of time. However, there have been no automatic systems developed to monitor the wear of parts such as tires and belts.

What is a needed is a system that can automatically monitor the wear of parts on a vehicle. Such a system should be able to detect when a part, such as a belt or tire, is completely worn out. It would also be of benefit if the system could detect uneven wear between tires, which is indicative of the need to rotate tires. It would also be of benefit if the system could detect uneven wear on one tire, which is indicative of a suspension problem. In addition, it would be of benefit if the system could be responsive to external factors relating to tire use.

SUMMARY OF THE INVENTION

A system in accordance with the present invention monitors and controls pressure of vehicle parts. The system consists of: a fleet of vehicles, each vehicle of the fleet having a cab and a trailer; a controller maintaining a wireless server and database for the fleet of vehicles; a first cellular device transmitting data to and from an electronic control unit of the cab of each vehicle and the controller; and a second cellular device transmitting data to and from an electronic control unit of the trailer of each vehicle and the controller. The first cellular device and the second cellular device each utilize a publicly accessible cellular network for communication with the controller.

According to another aspect of the system, the controller is a tire provider for the fleet of vehicles.

According to still another aspect of the system, the electronic control unit of each trailer of each vehicle only transmits data to and from the controller.

According to yet another aspect of the system, the controller receives GPS data from each cab and each trailer.

According to still another aspect of the system, the controller receives tire pressure and GPS data from each cab and trailer and sends control instructions to the electronic control unit of each cab and trailer.

According to yet another aspect of the system, each cab and each corresponding first cellular device are located at a single location.

According to still another aspect of the system, the second electronic control unit of each trailer sends only tire pressure data to the controller.

According to yet another aspect of the system, the first cellular device is a smartphone.

A method in accordance with the present invention monitors and controls pressure of vehicle parts. The method comprises the steps of: providing a fleet of vehicles, each vehicle of the fleet having a cab and a trailer; maintaining a wireless server and database for the fleet of vehicles; transmitting data to and from a first electronic control unit of the cab of each vehicle and a controller; and transmitting data to/from a second electronic control unit of the trailer of each vehicle and the controller.

According to another aspect of the method, the method further includes the step of utilizing a cellular device and a publicly accessible cellular network for transmitting data to and from the first and second electronic control units of each vehicle and the controller.

According to still another aspect of the method, the controller is a tire provider for the fleet of vehicles.

According to yet another aspect of the method, the method further includes the step of receiving GPS data from each cab and each trailer by the controller.

According to still another aspect of the method, the method further includes the step of receiving tire pressure and GPS data from each cab and each trailer and sending control instructions to the first and second electronic control units of each vehicle.

According to yet another aspect of the method, the method further includes the step of receiving GPS data from the first and second electronic control units of each vehicle.

According to still another aspect of the method, the method further includes the step of locating each cab and each first electronic control unit at a single location.

According to yet another aspect of the method, the method further includes the step of sending only tire pressure data by the second electronic control unit to the controller.

According to another aspect of the method, the method further includes the step of utilizing a cell phone for control of the controller and the first and second electronic control units.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF EXAMPLES OF THE PRESENT INVENTION

Figure 1:
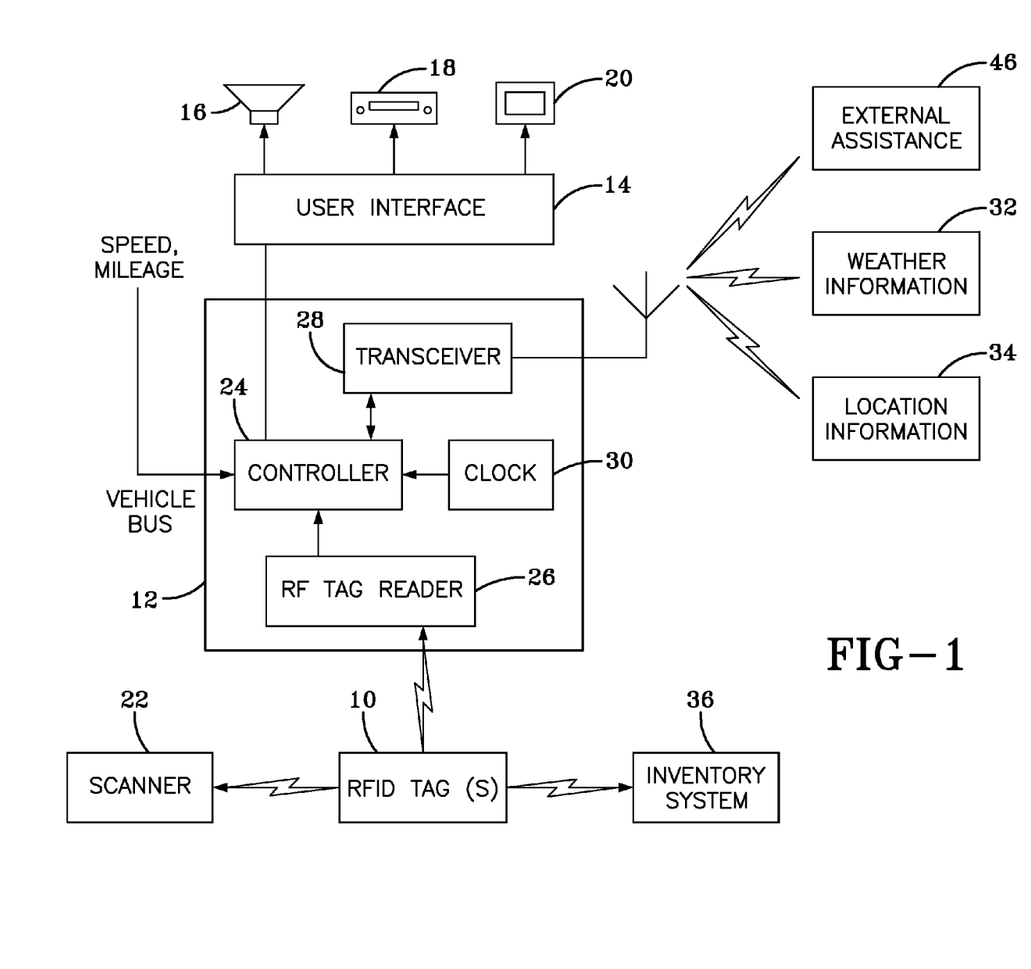
FIG. 1 shows a simplified block diagram for a system/method for use with the present invention.
Figure 2:
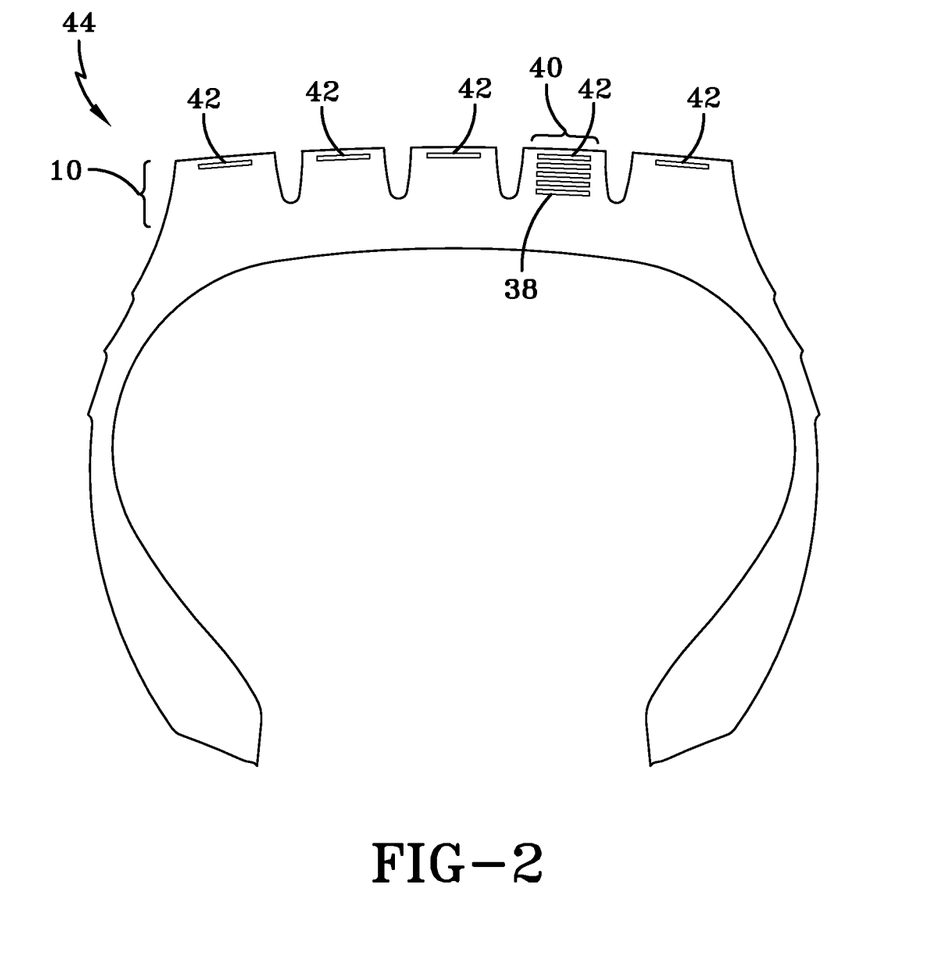
FIG. 2 shows a cross sectional view of a tire embedded with RFID tags for use with the present invention.
Figure 3:
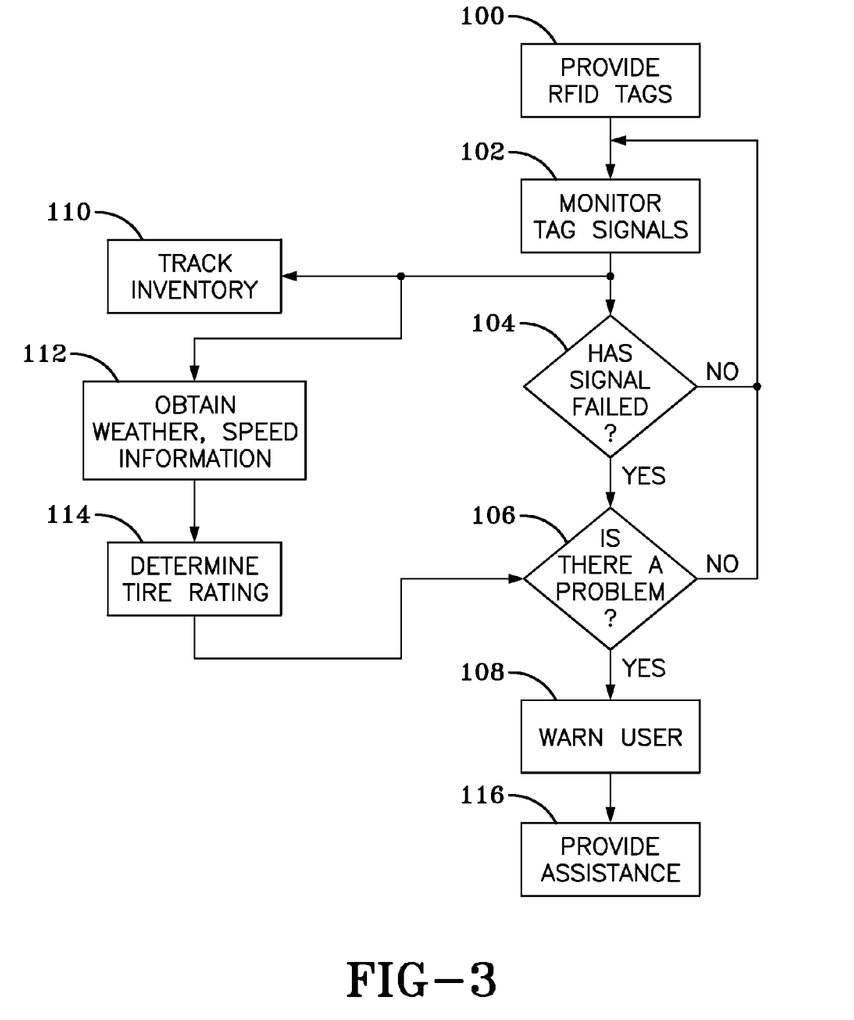
FIG. 3 shows a simplified block diagram of a system/method for use with the present invention.

As described in FIGS. 1-3 and U.S. Pat. No. 7,180,409, herein incorporated by reference, a system and method for use with the present invention may automatically monitor conditions of specific parts of a vehicle, such as, when a belt or tire is completely worn out. The system/method may also detect uneven wear between tires, which may indicate rotation of tires. The system/method may further detect uneven wear on one tire, which may indicate a suspension/alignment issue. The system/method may still further respond to external factors relating to tire use, such as weather conditions and vehicle velocity.

By way of example only, a main controller, a clock, a Radio Frequency Identification (RFID) tag reader, and/or a radio communication device may be embodied in a mobile cellular phone having cellular radiotelephone circuitry, as will not be described in detail here for simplicity. A mobile telephone may include cellular phone hardware (also not represented for simplicity) such as processors and/or user interfaces integrated into the vehicle. The mobile phone may further include a memory module and/or local area network connections that may be utilized by the present invention. Each particular electronic device may implement this concept and the means selected for each application. The system/method may be equally applicable to a portable and/or fixed hand scanner used in an automotive service facility or a tire manufacturer, distributor, wholesaler and/or retailer.

FIGS. 1 and 2 show a simplified representation of the example system/method. A communication device 12 may be coupled with a user interface 14. The communication device 12 may be coupled with an RFID tag reader 26, which may be externally connected or internal to the device 12 (as shown).

The communication device 12 may be installed in a vehicle, for example. An existing user interface 14 of the vehicle may include a loudspeaker 16, text display on a radio 18, or any other display 20, such as a dedicated vehicle information display or heads-up display, for example. Alternatively, a separate processor and/or user interface may be supplied. For example, the communication device 12 may be a scanner 22 with its own user interface, such as a handheld scanner or other dedicated scanner, for use in a service center, warehouse, and/or any other establishment that deals with belts, tires, an/or other wearable parts such as rubberized parts.

The system/method may utilize at least one RFID tag 38 with unique identification embedded in the tread of a tire 44 at a depth indicative of a fully worn part (e.g. the lowest acceptable tread depth of the tire). The RFID tag 38 may be placed in one or more tread elements (only one is shown) at a depth even with mechanical tread wear indicators. Similarly, the RFID tag 38 may be placed in a belt at a depth below the wearing surface that would indicate a worn belt. The example RFID tag 38 may be constructed with antenna leads in a co-linear configuration to provide a thin profile for ease of tire manufacture and uniform wear monitoring.

The RFID tag reader 26 may periodically monitor signals from at least one RFID tag 38. For example, the RFID tag reader 26 may be programmed by a controller 24 coupled thereto for reading all tire RFID tags 10 on the vehicle at engine start up. Thereafter, readings may be taken once per second, for example, until the vehicle engine is turned off. If the RFID tag reader 26 fails to obtain any signals from at least one RFID tag 10 (38), this would be indicative of a destroyed RFID tag and tread wear or belt wear to that location. However, if the RFID tag 10 (38) is prematurely destroyed by road hazards, multiple backup tags 10 may be disposed in the tire tread or belt. These are not shown in the accompanying figures for figure clarity.

When multiple tags 10 are used to detect a wear condition, the controller 24 may use a majority voting procedure to confirm an accurate wear condition. Moreover, if it is determined that one tag has prematurely failed, that missing reading can be ignored by the controller in the future. A failed RFID tag 10 may not be a problem, if normal wear is encountered. Upon identification of a problem, the controller 24 may direct the preferred user interface device 16, 18, and/or 20 to warn a user that the part containing that RFID tag 38 is worn.

The system/method may include a radio communication device, such as a transceiver 28 coupled to the controller 24. If the controller 24 determines that a tire is worn, the radio communication device may obtain external assistance 46 for a user of the vehicle relating to tire replacement. Additionally, the controller 24 may direct the user interface 14 to provide information to the user about external assistance 46. For example, the transceiver 28 may request assistance in locating a nearby tire service center. Or, a tire wear warning may be sent to a user's preferred tire service center as a query for tire replacement. Or, a query may be sent for potential advertisers who could contact the user through the transceiver 28 and user interface 14 to provide advertisements for tire service in the location of the vehicle.

A unique identifier for the RFID tags 10 may allow the controller 24 to detect signals for all the tires of the vehicle individually. For example, an automotive dealer or service center may record in the controller that RFID tag "A" is located in the left front tire, RFID tag "B" is located in the right front tire, RFID tag "C" is located in the left rear tire, RFID tag "D" is located in the right rear tire, and optionally RFID tag "E" is located in the spare tire.

The controller 24 may be reprogrammed as tires are changed and/or rotated during their service lifetime. Advantageously, the unique identifiers for the RFID tags 10 may also be used with a tire inventory system 36, wherein the unique identification of at least one RFID tag 10 (38) may be used by the inventory system for tracking, such as at a tire manufacturer, warehouse, distributor, retailer, and/or service center.

The multiple RFID tags 10 may be disposed in the tire tread to detect various tire wear properties. For example, RFID tags 42 disposed at the same tread depth across a tire tread may discover uneven wear of a tire tread, which may be indicative of a suspension problem. The vehicle may need a wheel alignment and/or other service. Similarly, RFID tags 40 disposed at different tread depths in a tire tread may discover uneven wear between tires on the same vehicle. Wheel rotation may be required. To detect problems using multiple RFID tags 10, it may further bat necessary to monitor when the RFID tags fail.

With a plurality of RFID tags 10 in each tire of a vehicle embedded at different tread depths 40, the controller 24 may monitor the progress of tire wear for each tire by determining when individual RFID tags are destroyed. For example, a clock 30 may be used by the controller 24 to record a time of each failure. If the RFID tags 10 at corresponding tread depths of each tire 44 are not all destroyed within a predetermined time period, the controller 24 may direct the user interface 14 to warn a user of the vehicle that the vehicle is experiencing uneven tire wear, which may require a wheel rotation and/or other repair.

Alternatively, mileage may be used to determine when RFID tags 10 fail. The controller 24 may read mileage from an existing vehicle bus 46. With a plurality of RFID tags 10 in each tire of the bus 46 embedded at different tread depths 40, the controller 24 may monitor the progress of tire wear for each tire by determining when individual RFID tags 10 are destroyed. For example, if the RFID tags 10 at the same tread depths in each tire are not all destroyed within a predetermined mileage range, the controller 24 may direct the user interface 14 to warn a user of the vehicle that the vehicle is experiencing uneven tire wear, which may require a wheel rotation and/or other repair. Optionally, a combination of both time and mileage may be used to detect this kind of tire wear.

With a plurality of RFID tags 10 in each tire of the vehicle embedded at the same depth 42 across the tread of the tire, the controller 24 may monitor the progress of tire wear for each individual tire by determining when individual RFID tags are destroyed. For example, if the RFID tags 10 at the same tread depth 42 of a tire are not all destroyed within a predetermined time period, as determined by the clock 30, the controller 24 may direct the user interface 14 to warn a user of the vehicle that the tire is experiencing uneven tire wear. Such wear may be indicative of a suspension problem, such as a need for a wheel alignment.

Alternatively, mileage may be used to determine when RFID tags 10 fail. The controller 24 may read mileage from an existing vehicle bus 46. With a plurality of RFID tags 10 in each tire of the vehicle embedded at the same depth 42 across the tread of the tire, the controller 24 may monitor the progress of tire wear for each individual tire by determining when individual RFID tags are destroyed. For example, if the RFID tags 10 at the same tread depth 42 of a tire are not all destroyed within a predetermined mileage range, the controller 24 may direct the user interface 14 to warn a user of the vehicle that the tire is experiencing uneven tire wear. Such wear may be indicative of a suspension problem, such as a need for a wheel alignment.

Optionally, a combination of both time and mileage may be used to detect this kind of tire wear. Although FIG. 2 shows a simplified view of RFID tags 10 located together, either across the tread 42 of the tire 44, or stacked in one tread element 40, the RFID tags 10 may also be distributed circumferentially around the tire. In addition, back up RFID tags may be located at the same depth locations in the tire for redundancy. When multiple RFID tags are used to detect a particular wear condition, the controller 24 may use a majority voting procedure to confirm an accurate tire wear indication. Moreover, if it is determined that one tag has prematurely failed, the missing reading of that tag may be ignored by the controller 24 in the future.

The RFID tags 10 may contain more than just a unique identifier. For example, the RFID tags 10 may contain tire build lot information, build date, tire manufacturer, tire model, speed rating, weather rating, load range, pressure range, etc. For example, a radio communication device, such as a transceiver 28, may be coupled to the controller 24. In this way, the radio communication device 12 may download weather information 32 and location information 34 and compare these against a weather rating of the tire in the unique identification of at least one RFID tag 10. If the controller 24 determines that the weather rating of the tire is not suitable for the current weather conditions in the location of the vehicle (i.e. snowy conditions using a non-snow tire), the controller may direct the user interface 14 to warn a user of the vehicle that the weather rating of the tire is not suitable for the current weather conditions.

Similarly, using the speed indication on the vehicle bus 46 and a speed range rating of the tire, the controller 24 may direct the user interface 14 to warn a user of the vehicle that the speed rating of the tire is not suitable for the current vehicle speed. In addition, using the build date of the tire, the controller 24 may direct the user interface 14 to warn a user of the vehicle that the age of the tire has been exceeded. Also, the tire manufacturer, tire model, build date, and/or lot information may be compared against recall information from external assistance 46, and a suitable warning may be presented to the user or contact made back through external assistance.

Referring to FIG. 3, the system/method for monitoring tread wear of a tire of a vehicle may include a user interface 14, clock 30, and/or mileage indicator. The system/method may include a first step 100 of providing a plurality of radio frequency identification (RFID) tags 10 with unique identification embedded in the tread of each tire. The system/method may utilize at least one radio frequency identification (RFID) tag 10 with unique identification embedded in the tread of the tire at a depth indicative of tire wear. Multiple RFID tags 10 may be disposed in the tire tread to detect various tire wear properties. For example, RFID tags 10 disposed at the same tread depth across a tire tread may be used to discover uneven wear of a tire, which may be indicative of a need for a wheel alignment and/or other service. Similarly, RFID tags 10 disposed at the different tread depths in a tire may be used to discover uneven wear between tires on a vehicle, which may be indicative of a need for a wheel rotation and/or other service.

A next step 102 may include periodically monitoring signals from the plurality of RFID tags 10. For example, a first reading of the signals from all tire RFID tags 10 on the vehicle may be monitored at engine start up. Thereafter, readings may be monitored once per second, for example, until the vehicle engine is turned off. The unique identifier for the RFID tags 10 may allow monitoring of all the tires of the vehicle individually, as detailed above. In addition, the unique identifiers for the RFID tags 10 may also be used to track tire inventories 110, such as at a tire manufacturer, warehouse, distributor, retailer, and/or service center.

A next step 104 may include detecting when an RFID tag 10 fails to send any more signals, indicating a destroyed RFID tag. A next step 106 may include determining whether the failed RFID tag 10 indicates a destroyed tag. If the RFID tag 01 has been prematurely destroyed by road hazards, the tag reading may be compared to backup tags disposed in the tire. In this way, a majority voting procedure may be used to confirm an accurate tire wear indication. Moreover, if it is determined that one tag has prematurely failed, that missing reading may be ignored in future determinations by the controller 24. A failed RFID tag 10 may not be a problem, if normal tire wear is encountered. This will be explained in more detail below.

A next step 108 may include warning a user of the vehicle. Several issues may be identified with various RFID tag configurations, as will be presented below. A user may also be presented with several solutions 116. For example, if it is determined that a tire is worn, an existing radio communication device 12 in the vehicle may be able to obtain external assistance 46 for a user of the vehicle relating to tire replacement or information may be provided to the user about the external assistance. In one example, external assistance 46 may be provided in locating a nearby tire service center. Or, the tire wear warning may also be sent to a user's preferred tire service center as a query for tire replacement. Or, a query may be sent for potential advertisers to contact the user through the existing radio communication device 12.

In practice, the providing step 100 may include providing RFID tags 10 embedded at different tread depths in each tire. The monitoring step 102 may monitor the progress of tire wear for each tire by determining when individual RFID tags 10 are destroyed. If the detecting step 104 detects that RFID tags 10 at corresponding tread depths of each tire are not all destroyed within at least one of the group of a predetermined time period and predetermined mileage range, the warning step 108 may warn a user of the vehicle that the vehicle is experiencing uneven tire wear.

Additionally, the providing step 100 may include providing RFID tags 10 embedded at the same tread depth across the tread of each tire. The monitoring step 102 may monitor the progress of tire wear for each tire by determining when individual RFID tags are destroyed. If the detecting step 104 detects that RFID tags 10 at the same tread depth of a tire are not all destroyed within at least one of the group of a predetermined time period and predetermined mileage range, the warning step 108 may warn a user of the vehicle that said tire is experiencing uneven tire wear.

The RFID tags 10 may contain more than just a unique identifier. For example, the RFID tags 10 may contain tire build lot information, build date, tire manufacturer, tire model, speed rating, weather rating, load range, pressure range, etc. For example, weather information and location information may be downloaded 112 and compared against a weather rating 114 of the tire in the unique identification of at least one RFID tag 10. If it is determined 106 that the weather rating of the tire is not suitable for the current weather conditions in the location of the vehicle (i.e. snowy conditions using a non-snow tire), the user of the vehicle may be warned 108 that the weather rating of the tire is not suitable for the current weather conditions.

Similarly, obtaining a speed indication of the vehicle 112 and a speed range rating 114 of the tire, the user may be warned 108 that the speed rating of the tire is not suitable for the current vehicle speed. In addition, using the build date of the tire, the controller 24 may direct the user interface 14 to warn a user of the vehicle that the age of the tire has been exceeded. Also, the tire manufacturer, tire model, build date, and/or lot information may be compared against recall information from external assistance 46 and a suitable warning may be presented to the user or contact made through external assistance.

"Telematics" is an interdisciplinary field encompassing telecommunications, vehicle technologies, road transportation, road safety, electrical engineering (e.g., sensors, instrumentation, wireless communications, etc.), and computer science (multimedia, Internet, etc.). Examples include the technology of sending, receiving, and storing information via telecommunication devices in conjunction with affecting control of remote objects, the integrated use of telecommunications and informatics applicable to vehicles and control of vehicles on the move, Global Positioning System (GPS) technology integrated with computers and mobile communications technology in automotive navigation systems, and the use of such systems with vehicles, or Vehicle Telematics. In contrast, telemetry is the transmission of measurements from a location of origin to a location of computing and consumption, principally without control of the remote objects. Telemetry is conventionally applied to testing of flight objects, but may have other uses.

Figure 4:
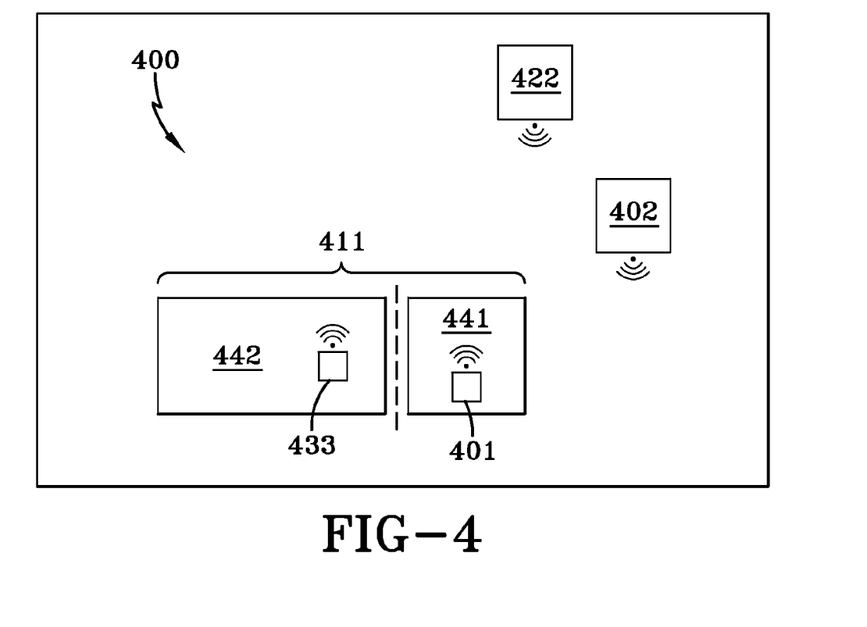
FIG. 4 schematically represents part of a data processing system/method in accordance with the present invention.
Figure 5:
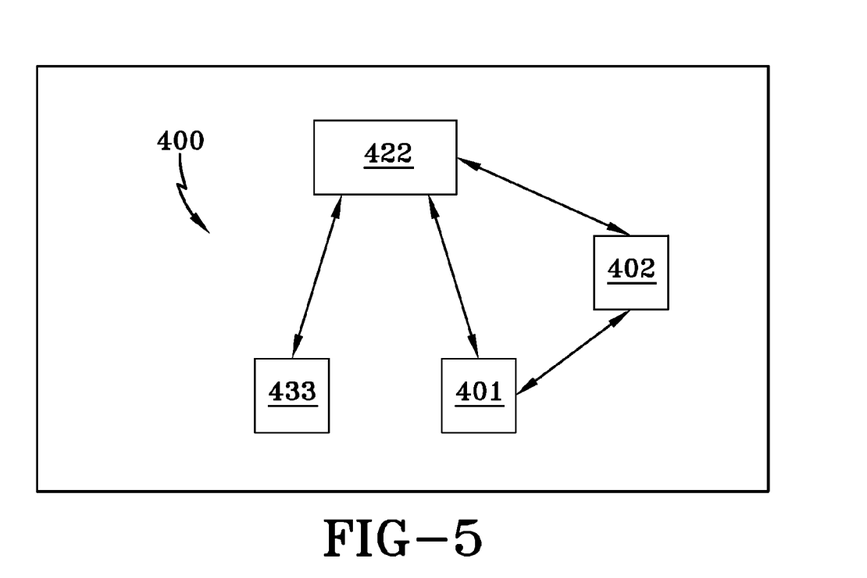
FIG. 5 schematically represents another part of a data processing system/method in accordance with the present invention.

As shown in FIGS. 4 and 5, a telematic system/method 400 in accordance with the present invention may define a tire pressure monitoring/control electronic control unit 401 that includes integration of a cellular chip 402 (e.g., enables wireless communication with a publicly accessible mobile phone cellular network). Conventional telematics systems require a three step and three party process chain: 1) a fleet, or customer; 2) a telematics partner; and 3) a controller, or an appropriate tire provider. The telematics partner may enable the system and be crucial to the conventional system. Remote monitoring of tire pressure may use telematics (e.g., network hardware, data transmission software, etc.) as a means to transmit the data to/from a monitored vehicle from/to a server for further processing.

A system/method 400 in accordance with the present invention may be described as a "cell phone-enabled control unit for a tire pressure monitoring system (TPMS)". This cell phone-enabled system/method may thus define a two party setup: 1) a fleet, or customer 411; and 2) a controller, or appropriate tire provider 422. The cell phone-enabled system/method 400 may thus eliminate the telematics partner, allowing direct transmission to/from the customer 411 from/to the appropriate tire provider 422, and thereby reduce cost and complexity compared to the conventional system.

The system/method 400 may further include communication between an electronic control unit 433 mounted to, and monitoring, TPMS data from a trailer 442 of the fleet 411 to the controller 422. The cellular chip 401 of a suitable electronic device (e.g., a cellular phone, a smartphone, a tablet, dedicated cellular device, etc.) may consequently transmit data to/from the cab electronic control unit 401 and the appropriate tire provider 422. Further, the electronic control units 401, 433 of the cab 441 and the trailer 442 may have each cellular chips for independent communication over a publicly accessible cellular network with the controller 422. Thus, the cell phone 402 may or may not be used with the system/method 400. The tire provider may maintain a wireless server and database for the fleet 411.

A smartphone may be defined as a cellular phone able to perform many of the functions of a computer, typically having a relatively large screen and an operating system capable of running general-purpose public applications. A smartphone may also be defined as a cellular telephone with built-in applications and internet access. In addition to digital voice service, modern smartphones may provide text messaging, e-mail, Web browsing, still and video cameras, MP3 player, and/or video playback and calling. In addition to their built-in functions, smartphones may run myriad free and paid applications, turning the once single-minded cellphone into a mobile personal computer.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed:

1. A system for monitoring and controlling pressure of vehicle parts, the system consisting of:
   a fleet of vehicles, each vehicle of the fleet having a cab and a trailer;
   a controller maintaining a wireless server and database for the fleet of vehicles;
   a first cellular device transmitting data to and from an electronic control unit of the cab of each vehicle and the controller; and
   a second cellular device transmitting data to and from an electronic control unit of the trailer of each vehicle and the controller, the first cellular device and the second cellular device each utilizing a publicly accessible cellular network for communication with the controller.

2. The system as set forth in claim 1 wherein the controller is a tire provider for the fleet of vehicles.

3. The system as set forth in claim 1 wherein the electronic control unit of each trailer of each vehicle only transmits data to and from the controller.

4. The system as set forth in claim 1 wherein the controller receives GPS data from each cab and each trailer.

5. The system as set forth in claim 1 wherein the controller receives tire pressure and GPS data from each cab and trailer and sends control instructions to the electronic control unit of each cab and trailer.

6. The system as set forth in claim 1 wherein each cab and each corresponding first cellular device are located at a single location.

7. The system as set forth in claim 1 wherein the electronic control unit of each trailer sends only tire pressure data to the controller.

8. The system as set forth in claim 1 wherein the first cellular device is a smartphone.

9. A method for monitoring and controlling pressure of vehicle parts, the method comprising the steps of:
providing a fleet of vehicles, each vehicle of the fleet having a cab and a trailer;
maintaining a wireless server and database for the fleet of vehicles;
transmitting data to and from a first electronic control unit of the cab of each vehicle and a controller; and
transmitting data to/from a second electronic control unit of the trailer of each vehicle and the controller.

10. The method as set forth in claim 9 further including the step of utilizing a cellular device and a publicly accessible cellular network for transmitting data to and from the first and second electronic control units of each vehicle and the controller.

11. The method as set forth in claim 9 wherein the controller is a tire provider for the fleet of vehicles.

12. The method as set forth in claim 9 further including the step of receiving GPS data from each cab and each trailer by the controller.

13. The method as set forth in claim 9 further including the step of receiving tire pressure and GPS data from each cab and each trailer and sending control instructions to the first and second electronic control units of each vehicle.

14. The method as set forth in claim 9 further including the step of receiving GPS data from the first and second electronic control units of each vehicle.

15. The method as set forth in claim 9 further including the step of locating each cab and each first electronic control unit at a single location.

16. The method as set forth in claim 9 further including the step of sending only tire pressure data by the second electronic control unit to the controller.

17. The method as set forth in claim 9 further including the step of utilizing a cell phone for control of the controller and the first and second electronic control units.

* * * * *